(12) United States Patent
Lippman et al.

(10) Patent No.: US 10,336,385 B2
(45) Date of Patent: Jul. 2, 2019

(54) PROXIMITY-BASED BICYCLE ALARM

(71) Applicant: Ford Global Technologies, LLC, Dearborn, MI (US)

(72) Inventors: Mark Allan Lippman, New Baltimore, MI (US); Mangala A. Jayasuriya, Bloomfield Hills, MI (US); Jayanthi Rao, West Bloomfield, MI (US); Eric H. Wingfield, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 727 days.

(21) Appl. No.: 14/533,443

(22) Filed: Nov. 5, 2014

(65) Prior Publication Data

US 2016/0121951 A1    May 5, 2016

(51) Int. Cl.
| | |
|---|---|
| *B62H 5/20* | (2006.01) |
| *B60Q 9/00* | (2006.01) |
| *A63B 24/00* | (2006.01) |
| *B62M 6/30* | (2010.01) |
| *B60R 25/10* | (2013.01) |

(52) U.S. Cl.
CPC ..................... *B62H 5/20* (2013.01)

(58) Field of Classification Search
CPC ....................................................... B62H 5/20
USPC .............................................. 340/427, 432
See application file for complete search history.

(56) References Cited

U.S. PATENT DOCUMENTS

| | | | |
|---|---|---|---|
| 3,794,967 A | 2/1974 | Fischer | |
| 4,897,630 A | 1/1990 | Nykerk | |
| 5,815,069 A | 9/1998 | Horton | |
| 6,060,982 A | 5/2000 | Holtrop | |
| 6,979,013 B2 | 12/2005 | Chen | |
| 7,468,667 B2 | 12/2008 | Moffett | |
| 9,150,153 B2* | 10/2015 | Konet | ..................... B60Q 5/008 |
| 2010/0167783 A1* | 7/2010 | Alameh | ............... H04M 1/0202 |
| | | | 455/556.1 |
| 2010/0228434 A1* | 9/2010 | Leyerle | .................. B60Q 5/008 |
| | | | 701/36 |
| 2011/0063120 A1 | 3/2011 | Ebner | |
| 2013/0150028 A1 | 6/2013 | Akins et al. | |
| 2013/0328616 A1* | 12/2013 | Buttolo | ................ H03K 17/955 |
| | | | 327/517 |

(Continued)

FOREIGN PATENT DOCUMENTS

| | | |
|---|---|---|
| CN | 2825435 Y | 10/2006 |
| CN | 203032613 U | 7/2013 |

(Continued)

OTHER PUBLICATIONS

"The Cricket—Your First and Last Line of Defense", © 2013 The Cricket—By FLYTREX (http://www.flytrex.com), 6 pages.

(Continued)

*Primary Examiner* — Jack K Wang
(74) *Attorney, Agent, or Firm* — Brandon Hicks; Bejin Bieneman PLC

(57) ABSTRACT

An alarm system for a vehicle, such as a bicycle, includes a touch sensor electrically connected to a vehicle frame. The touch sensor outputs an alarm signal based on a proximity of a person to the vehicle frame. A communication module receives signals from a remote device. A controller is programmed to selectively enable and disable the touch sensor in response to signals received from the remote device.

20 Claims, 2 Drawing Sheets

(56) References Cited

U.S. PATENT DOCUMENTS

| | | | | |
|---|---|---|---|---|
| 2015/0109116 A1* | 4/2015 | Grimm | ............... | B60R 25/1001 |
| | | | | 340/426.18 |
| 2015/0291254 A1* | 10/2015 | Lee | ......................... | B62M 6/50 |
| | | | | 180/206.3 |
| 2015/0367176 A1* | 12/2015 | Bejestan | ............. | G06F 19/3481 |
| | | | | 482/9 |
| 2016/0257248 A1* | 9/2016 | Lisseman | ............... | B60K 37/06 |
| 2016/0267335 A1* | 9/2016 | Hampiholi | .............. | G06F 3/013 |

FOREIGN PATENT DOCUMENTS

| | | | |
|---|---|---|---|
| CN | 203921015 U | * | 11/2014 |
| EP | 2176117 B1 | | 3/2011 |
| GB | 2435900 A | | 9/2007 |
| JP | 2010239587 A | | 10/2010 |
| JP | 2011027630 A | | 2/2011 |
| JP | 2012083808 A | | 4/2012 |
| WO | 0156869 A1 | | 8/2001 |

OTHER PUBLICATIONS

GB Search Report 1519480.6 dated Apr. 29, 2016.
Notification of Second Office Action from the State Intellectual Property Office of the People's Republic of China (SIPO) regarding Application No. 201510690730.3 dated Apr. 10, 2019 (Original with English translation).

* cited by examiner

PROXIMITY-BASED BICYCLE ALARM

BACKGROUND

Bicycles are very common in urban areas, college campuses, and other places where pedestrian traffic is high. Unfortunately, theft of unsecured bicycles is high in many urban areas. Common ways of securing unattended bicycles include tethering and locking the bicycle to a larger structure such as a bicycle rack, telephone pole, or signpost. Different types of bicycle locks offer different levels of security. Even the presence of the most basic lock, however, can serve as a theft deterrent.

DETAILED DESCRIPTION

Although simply using a bicycle lock may deter some thieves, a simple bicycle lock may be ineffective against a more determined thief, especially a thief that is able to disable the lock without drawing attention. An example alarm system that can draw attention to a potential thief includes a touch sensor, a communication module, and a controller. The touch sensor is electrically connected to the bicycle frame and outputs an alarm signal based on a proximity of a person to the frame. The communication module receives signals from a remote device such as a cell phone or fob. The controller is programmed to selectively enable and disable the touch sensor in response to signals received from the remote device.

When the thief approaches or touches the bicycle equipped with the disclosed alarm system, the alarm signal causes an audible alert, a visual alert, or both, to notify those nearby of the potential theft. Moreover, the communication module may transmit a signal to the owner indicating the attempted theft. The owner can disable the alarm signal by sending a disable signal to the alarm signal from, e.g., his or her cell phone, fob, or other remote device.

Further, the alarm system may include a shock sensor configured to detect forces applied to the touch sensor. Therefore, should someone attempt to disable the touch sensor by, e.g., breaking the touch sensor with a tool such as a hammer, the alert signal will be triggered.

The elements shown may take many different forms and include multiple and/or alternate components and facilities. The example components illustrated are not intended to be limiting. Indeed, additional or alternative components and/or implementations may be used.

Figure 1:
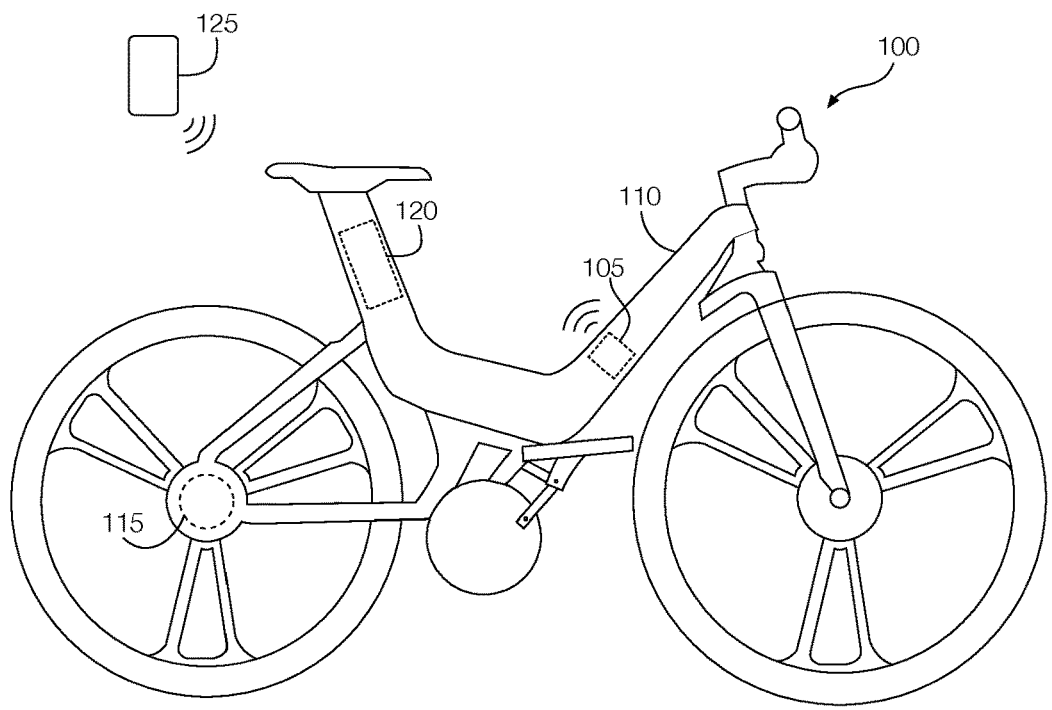
FIG. 1 illustrates an example bicycle with a proximity-based alarm system.

As illustrated in FIG. 1, the bicycle 100 includes an alarm system 105 incorporated into a frame 110. The frame 110 may be at least partially formed from an electrically conductive material. In some instances, the frame 110 may be coated with paint, plastic, or another material, even insulating materials. Thus, the frame 110 may include any electrically conductive path connected to the alarm system 105. Moreover, portions of the bicycle 100 that are not electrically conductive, such as the seat, for instance, may be coated with an electrically conductive material. Portions of the frame 110 may be hollow to receive portions of the alarm system 105.

In some possible implementations, the bicycle 100 may be equipped with an electric motor 115 and power source 120. Energy from the power source 120 may be transmitted to the motor. In accordance with the energy from the power source 120, the motor may propel the wheels of the bicycle 100. The bicycle 100 may include pedals in addition to the motor, in which case the motor may be used as an alternative propulsion source or to assist the rider while the rider pedals the bicycle 100. Moreover, the power source 120 may be electrically connected to the alarm system 105 to provide electrical energy to the alarm system 105.

Although the term "bicycle" is used, the alarm system 105 may be incorporated into many different types of vehicles. For example, the alarm system 105 could be incorporated into a tricycle, quadricycle, motorcycle, or the like.

The alarm system 105 may be configured to output an alarm signal based on a proximity of a person to the frame 110. The proximity may be detected by, e.g., a capacitive or electrically conductive force established between the person and the frame 110. The alarm system 105 may be selectively enabled and disabled by a remote device 125 such as a mobile phone, fob, or tablet computer. That is, the alarm system 105 may become armed in response to receiving an enable signal and disarmed in response to receiving a disable signal. The alarm system 105 may be further configured to output an audible alert or a visual alert when a person touches the frame 110. The alarm system 105 may be further configured to transmit a signal to the remote device 125 notifying the owner of the bicycle 100 of the potential theft. Moreover, the alarm system 105 may include an anti-tamper mechanism and output the alarm signal or transmit a signal notifying the owner when someone is attempting to disable the alarm system 105.

Figure 2:
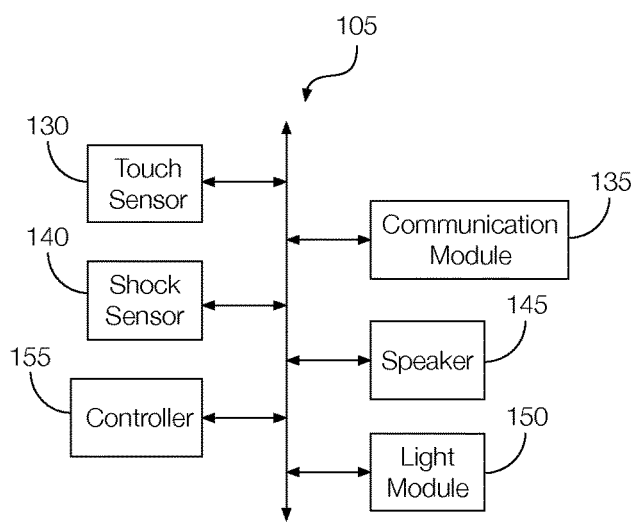
FIG. 2 is a block diagram of an example alarm system that may be used with the bicycle of FIG. 1.

FIG. 2 is a block diagram showing example components of the alarm system 105. As illustrated, the alarm system 105 includes a touch sensor 130, a communication module 135, a shock sensor 140, a speaker 145, at least one light module 150, and a controller 155.

The touch sensor 130 may be configured to detect when a person touches or is very close to the bicycle frame 110. The touch sensor 130 may include a capacitive switch that detects a capacitive force generated when a person touches or almost touches the frame 110. Another type of touch sensor 130 may include a resistance touch switch configured to output a signal when the resistance between two terminals is lowered by, e.g., a person touching or almost touching the frame 110. The touch sensor 130 may be calibrated for proximity. That is, the sensitivity of the touch sensor 130 may be adjusted so that the alarm signal is only output when someone is within a certain predetermined distance of the frame 110. For instance, the sensitivity may be adjusted so that the alarm signal is output when someone is within, e.g., six inches of the frame 110. The sensitivity could be decreased so that someone must actually touch the frame 110 or coating on the frame 110 to trigger the alarm signal and by coating non-conductive portions of the bicycle 100 with a conductive material, the touch sensor 130 may be able to detect someone touching virtually any surface of the bicycle 100.

The communication module 135 may include a computing device programmed to receive and transmit wireless signals. Examples of signals the communication module 135 can receive may include the enable signal and disable signal transmitted from the remote device 125 to the alarm system

105. Examples of signals transmitted by the communication module 135 may include signals alerting the owner of the bicycle 100 that someone has attempted to steal the bicycle 100 or that someone has attempted to disable the alarm system 105. The communication module 135 may be programmed to communicate using any number of telecommunication protocols such as a cellular communication protocol, a satellite communication protocol, a radio frequency communication protocol, WiFi, or Bluetooth®. The signals received by the communication module 135 may be received via the same or different protocol than signals transmitted by the communication module 135. For example, the remote device 125 and communication module 135 may communicate using, e.g., a cellular communication protocol. Alternatively, the remote device 125 may transmit, and the communication module 135 may receive, signals according to a radio frequency communication protocol while the communication module 135 may send signals to the owner's mobile phone using, e.g., a cellular communication protocol.

The shock sensor 140 may include an accelerometer or another device configured to detect an impact, vibration, or other force applied to the alarm system 105, and in particular, to the touch sensor 130. The shock sensor 140 may be configured to measure the force applied to the frame 110 or a part of the frame 110 and output a shock signal if the force exceeds a predetermined value. The predetermined value may be based on whether it is likely that the force detected was intended to disable the alarm system 105. Therefore, simply bumping into the bicycle 100 may not cause the shock sensor 140 to output the shock signal. Hitting the frame 110 with a hammer, however, especially at a location near the touch sensor 130, may cause the shock sensor 140 to output the shock signal.

The speaker 145 may be configured to convert the alarm signal into an audible alert. The speaker 145 may include a piezoelectric buzzer or any other device configured to vibrate in accordance with the alert signal. The speaker 145 may be embedded into the frame 110, and in some possible approaches, the frame 110 may include holes to make the speaker 145 louder. In some instances, the speaker 145 may be electrically connected to the touch sensor 130. Therefore, the speaker 145 may receive the alarm signal directly from the touch sensor 130. The speaker 145 may receive electrical energy from the power source 120 so that it may amplify the alarm signal.

The light module 150 may include any number of devices configured to generate light when provided with an electrical signal. The light module 150, therefore, may include any number of light emitting diodes. The light module 150 may be electrically connected to the controller 155, the touch sensor 130, or both, and may become illuminated in response to receiving the alarm signal or a signal from the controller 155. The light module 150 may be powered by the power source 120.

The controller 155 may include a computing device programmed to selectively enable and disable the touch sensor 130 in response to the enable and disable signals received, via the communication module 135, from the remote device 125. For instance, the controller 155 may, in response to receiving the enable signal, electrically connect the touch sensor 130 to the power source 120. In response to receiving the disable signal, the controller 155 may electrically disconnect the touch sensor 130 from the power source 120.

In some possible approaches, the controller 155 may be programmed to adjust the sensitivity of the touch sensor 130. That is, the controller 155 may be programmed to make the touch sensor 130 more or less sensitive to increase or decrease the predetermined distance that a person must be relative to the frame 110 before the touch sensor 130 outputs the alarm signal. The controller 155 may physically adjust the sensitivity of the touch sensor 130 by, e.g., adjusting a resistor value or other circuit value. The controller 155 may alternatively adjust the sensitivity via a command signal. For instance, the controller 155 may send a command signal commanding the touch sensor 130 to only output the alarm signal when a capacitive field strength exceeds a particular value.

The controller 155 may be electrically connected to the light module 150. The controller 155 may, in response to receiving the enable or disable signal, send an illumination signal to the light module 150. The illumination signal may cause the light module 150 to become illuminated for a brief period of time. Therefore, the owner of the bicycle 100 may receive a visual confirmation that the enable signal and disable signals sent from the mobile device have been received by the alarm system 105. Further, the controller 155 may be programmed to transmit the illumination signal to the light module 150 in response to other types of signals received from the remote device 125. By way of example, the remote device 125 may include a "find my bicycle" feature. When that feature is activated, the controller 155 may receive a corresponding signal from the remote device 125, and in response, transmit the illumination signal to the light module 150. The light module 150 will become illuminated, at least temporarily, giving the owner an indication of where the owner's bicycle 100 is located.

To avoid false negatives—situations where the touch sensor 130 is accidentally or inadvertently triggered—the controller 155 may be programmed to delay the alert signal from reaching the speaker 145 or light module 150. The controller 155 may allow the alert signal to pass to the speaker 145 or light module 150 if the alert signal is output for a predetermined amount of time, which may occur if someone is holding onto the frame 110 as opposed to someone who accidentally bumped the frame 110.

The controller 155 may be further programmed to reset the touch sensor 130 and shock sensor 140 after a predetermined amount of time. For instance, as discussed above, if the touch sensor 130 outputs the alarm signal or the shock sensor 140 outputs the shock signal, an audible or visual alert may be presented to notify others of the potential theft of the bicycle 100. Outputting audible and visual alerts may drain the power source 120. To prevent a single instance from draining the power source 120, the controller 155 may reset the touch sensor 130 and shock sensor 140 after, e.g., one minute. In other words, the controller 155 may be programmed to allow the touch sensor 130 and shock sensor 140 to output the alarm signal and shock signal, respectively, for up to one minute or any other predetermined amount of time sufficient to warn others of the potential theft but not so long as it significantly depletes the power source 120.

Figure 3:
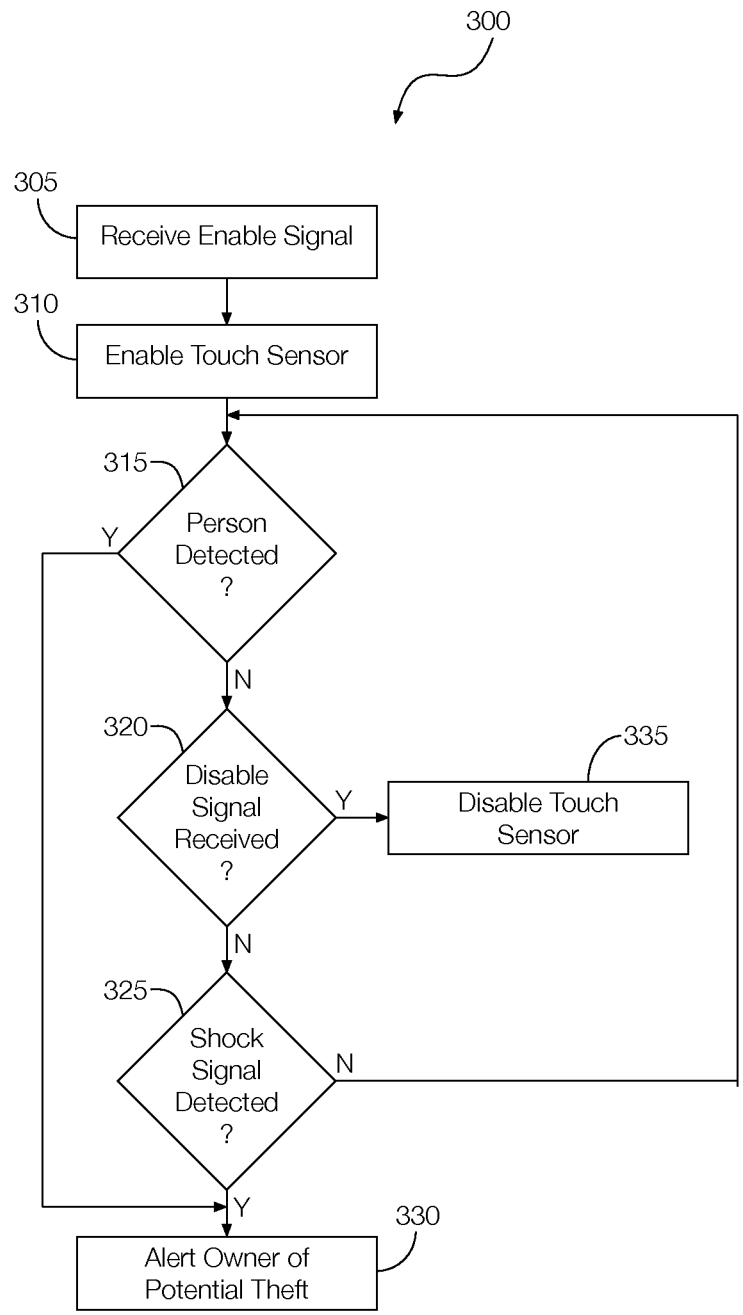
FIG. 3 is a flowchart of an example process that may be executed by the alarm system of FIGS. 1 and 2.

FIG. 3 is a flowchart of an example process 300 that may be executed by the alarm system 105. The process 300 may be executed at any time while the bicycle 100 is not in use. For instance, the process 300 may be initiated at block 305.

At block 305, the alarm system 105 may receive an enable signal from the remote device 125. The enable signal may be transmitted wirelessly from the remote device 125 and received at the alarm system 105 by the communication module 135. The communication module 135 may pass the enable signal to the controller 155.

At block 310, the alarm system 105 may enable the touch sensor 130. For instance, the controller 155 may electrically connect the touch sensor 130 to the power source 120.

At decision block 315, the alarm system 105 may determine whether a person is within a predetermined distance of the frame 110. The predetermined distance may be zero, meaning that the person must be touching the frame 110 to be detected. Alternatively, the predetermined distance may be a non-zero value such as, e.g., six inches. When a person is detected, the process 300 may continue at block 330. Otherwise, the process 300 may continue at block 320.

At decision block 320, the alarm system 105 may determine whether a disable signal has been received. If so, the process 300 may continue at block 335. If not, the process 300 may continue at block 325.

At decision block 325, the alarm system 105 may determine whether someone is attempting to disable the touch sensor 130. For instance, the controller 155 may determine that someone is attempting to disable the alarm system 105 by monitoring the output of the shock sensor 140. The shock sensor 140 may output the shock signal in response to a force applied to the touch sensor 130 or frame 110. If the shock signal is detected, the process 300 may continue at block 330. If no shock signal is detected, the process 300 may continue at block 315.

At block 330, the alarm system 105 may alert the owner of a potential theft of the bicycle 100. That is, the touch sensor 130 may output the alarm signal in response to detecting a nearby person. Alternatively or in addition, the shock sensor 140 may output the shock signal in response to detecting a force applied to the touch sensor 130 or the frame 110. The controller 155 may, in response to detecting the alarm signal or the shock signal, cause the speaker 145 to output an audible alert, cause the light module 150 to illuminate to generate a visual alert, and send a message to an owner's mobile device via the communication module 135.

At block 335, the alarm system 105 may disable the touch sensor 130 and shock sensor 140 in accordance with the disable signal received. The disable signal may be transmitted by the remote device 125 and received via the communication module 135. In response to receiving the disable signal, the controller 155 may disable the touch sensor 130 and the shock sensor 140. Therefore, the owner of the bicycle 100 or another authorized person can touch the bicycle 100 without triggering the alarm system 105. Moreover, the disable signal may further cause the alarm system 105 to stop providing an audible or visual alert. That is, if the alarm signal or shock signal is generated at block 330, the disable signal may be used to turn off any audible or visual alerts coming from the speaker 145 or light module 150, respectively. Alternatively, the alarm signal or shock signal generated at block 330 may be turned off after a predetermined amount of time so as not to deplete the power source 120.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An alarm system comprising:
a touch sensor electrically connected to a vehicle frame coated with an electrically conductive material, wherein the touch sensor is configured to output an alarm signal based on a proximity of a person to the vehicle frame;
a communication module configured to receive signals from a remote device; and
a controller programmed to selectively enable and disable the touch sensor in response to signals received from the remote device.

2. The alarm system of claim 1, wherein the touch sensor is configured to output the alarm signal if the person is within a predetermined distance of the vehicle frame.

3. The alarm system of claim 2, wherein the predetermined distance is six inches.

4. The alarm system of claim 2, wherein the controller is programmed to adjust a sensitivity of the touch sensor.

5. The alarm system of claim 4, wherein adjusting the sensitivity includes increasing the predetermined distance.

6. The alarm system of claim 4, wherein adjusting the sensitivity includes decreasing the predetermined distance.

7. The alarm system of claim 1, further comprising a shock sensor disposed on the vehicle frame and configured to detect a force applied to the touch sensor and output a shock signal if the force applied to the touch sensor exceeds a predetermined value.

8. The alarm system of claim 1, further comprising a speaker configured to convert the alarm signal into an audible alert.

9. The alarm system of claim 1, wherein the touch sensor is disposed within the vehicle frame.

10. A vehicle system comprising:
a remote device configured to wirelessly transmit an enable signal and a disable signal;
a bicycle having a frame coated with an electrically conductive material, a touch sensor electrically connected to the frame and configured to output an alarm signal based on a proximity of a person to the frame, a communication module configured to receive signals from the remote device, and a controller programmed to selectively enable the touch sensor in response to receiving the enable signal from the remote device and selectively disable the touch sensor in response to receiving the disable signal from the remote device.

11. The vehicle system of claim 10, wherein the touch sensor is configured to output the alarm signal if the person is within a predetermined distance of the frame.

12. The vehicle system of claim 11, wherein the predetermined distance is six inches.

13. The vehicle system of claim 11, wherein the controller is programmed to adjust a sensitivity of the touch sensor.

14. The vehicle system of claim 13, wherein adjusting the sensitivity includes increasing the predetermined distance.

15. The vehicle system of claim 13, wherein adjusting the sensitivity includes decreasing the predetermined distance.

16. The vehicle system of claim 10, further comprising a shock sensor disposed on the frame and configured to detect a force applied to the touch sensor output a shock signal if the force applied to the touch sensor exceeds a predetermined value.

17. The vehicle system of claim 10, further comprising a speaker configured to convert the alarm signal into an audible alert.

18. The vehicle system of claim 10, wherein the touch sensor is disposed within the frame.

19. A method comprising:
receiving an enable signal from a remote device;
enabling a touch sensor;
detecting a person is within a predetermined distance of a bicycle frame coated with an electrically conductive material;
generating an alarm signal if the person is detected within the predetermined distance of the bicycle frame;
receiving a disable signal from the remote device; and
disabling the touch sensor in response to receiving the disable signal.

20. The method of claim 19, further comprising:
detecting a force applied to the touch sensor; and
generating a shock signal if the force applied to the touch sensor exceeds a predetermined value.

* * * * *